July 4, 1939.  H. M. FLINT ET AL  2,164,706

TEAT-CUP LINING

Filed Feb. 1, 1938

Inventors
Harry M. Flint,
John Edgar Moe.

By Martin E. Anderson
Attorney

Patented July 4, 1939

2,164,706

UNITED STATES PATENT OFFICE 2,164,706

TEAT-CUP LINING

Harry M. Flint and John Edgar Moe, Denver, Colo., assignors to The Gates Rubber Company, Denver, Colo., a corporation of Colorado Application February 1, 1938, Serial No. 188,039

4 Claims. (Cl. 31—35)

This invention relates to improvements in teat cup linings for milking machines.

The modern milking machines are operated by means of compressed air and suction and are provided with metal teat cups having a flexible tubular lining of impervious material.

Lining tubes are usually made from rubberized fabric or of rubber provided with a flexible fabric reenforcement. Such tubes are flexible but are not extensible either transversely or longitudinally and are therefore not adjustable and consequently will fit only one size of teat cup.

Experience has shown that teat cup linings should be circumferentially reenforced but they should be longitudinally extensible. The ends should not be reenforced by fiber because it is oftentimes desirable to be able to stretch the lining at the ends to effect a connection with the teat cup and the milk delivery tube.

It is one object of this invention to produce a teat cup lining that shall have circumferential reenforcement only so that it may be stretched in the direction of its length.

It is well known that rubber swells, becomes soft and loses much of its resiliency when subjected to the action of an oil and experience has shown that the butter fat present in milk has a deleterious effect on the rubber used in teat cups, with the result that it is weakened and acquires a permanent transverse set which reduces the clearance between the teat cup lining and the teat cup to such an extent that the milking machines cease to function properly.

If the growth of the lining is inhibited transversely, no harm results from a growth or permanent set in the direction of the length of the lining. When the lining is allowed to expand in the direction of its length it adjusts itself more easily to the conditions under which it is operating than if it could not so expand, and therefore lasts longer.

Another object of this invention is therefore to so reenforce a teat cup lining that its transverse growth is prevented while its longitudinal growth is permitted.

The above and any other objects that may appear as the description proceeds are attained by means of a construction that will now be described, and reference for this purpose will be had to the accompanying drawing in which the invention has been illustrated and in which.

Figure 1:
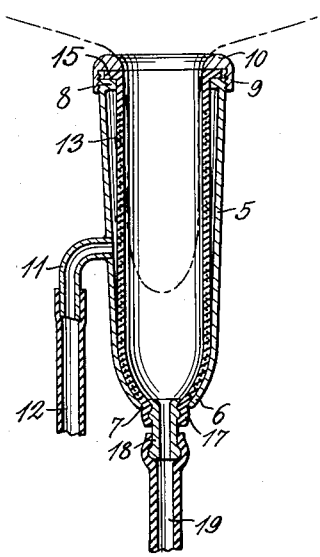
Figure 1 is a longitudinal diametrical cross section through a teat cup showing the lining in place therein.

In Fig. 1, the metal teat cup has been shown in section and designated by reference numeral 5. Both ends are open. The lower end 6 is tapered and terminates in an opening 7. The cup is preferably upwardly flaring and is provided at its upper end with an inwardly extending flange 8. The outer surface, adjacent the upper end is provided with a threaded section 9 which cooperates with an inner thread on the flange of the cover 10. A tube 11 is attached to the cup and has connected to it the compressed air tube 12.

Positioned in the cup 5 is a tubular lining 13 which forms the subject of this invention. The tubular lining is preferably made from rubber composition so compounded and vulcanized that it will be flexible and elastic. The lining is cylindrical and terminates at its lower end in a tapered portion 14 that corresponds in size and shape to the inside of the tapered portion 6 of the cup. The outer diameter of the lining is substantially the same as the diameter of the opening in the flange 8. The upper end of the lining is provided with a flange 15 whose under surface is undercut in the manner indicated at 16. The tapered end 14 terminates in a cylindrical extension 17 which projects through the opening 7 in the lower end of the cup. The flange 15 extends into the annular space between the upper end of the cup and the cover and is clamped in position by the latter. A connector 18 extends through the cylindrical portion 17 and connects the inside of the lining with a suction tube 19.

Since this invention relates to the construction of the lining the operation of the milker will not be described since no improvement has been made on any other part of the machine.

Teat cup linings having the same shape and size as that illustrated are old and have been used with teat cups like that illustrated in Fig. 1 but they have been constructed in a different manner.

Figure 2:
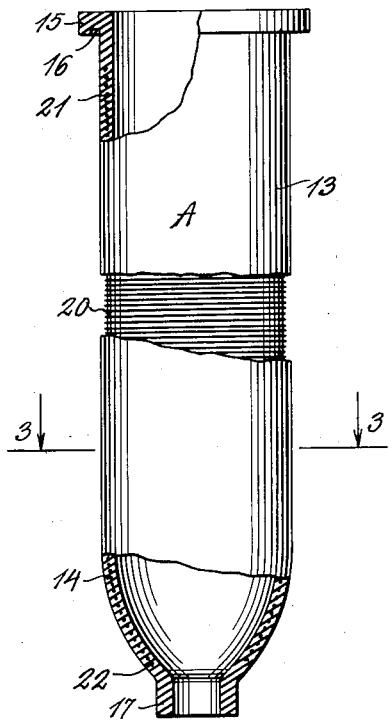
Figure 2 is a side elevation of the improved teat cup showing portions in section and portions broken away so as to better disclose the construction.
Figure 3:
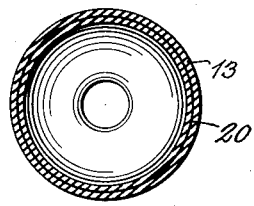
Figure 3 is a transverse section taken on line 3—3 Fig. 2.

Referring now to Figs. 2 and 3 it will be seen that the lining is provided with a circumferential reenforcement comprising a cotton cord 20 of proper tensile strength which extends helically around the lining and is embedded in the wall of the latter.

The reenforcement starts at 21, a short distance below the flange 15 and terminates at 22, substantially at the lower end of the tapered section 14. The reenforcement may terminate somewhat higher than that shown because the tapered portion fits the inner tapered surfaces of the cup and the latter resists all strains tending to expand the lining at that point.

The reenforcing cord is embedded in the material of the lining and the latter is made from two layers of rubber. One layer is wrapped about a core or mandrel after which the cord 20 is wound helically thereabout. After the cord is wound onto the first rubber layer, another sheet is wrapped around the first layer and the cord, after which the lining is enclosed in a suitable mould and given the necessary cure. After the lining has been cured it is removed from the mould. Since the reenforcing cord is in the center of the wall of the lining, it is not visible from the outside and the lining presents a smooth outer surface like that designated by letters A.

The only reenforcement used is the helical cord, which does not resist longitudinal extension but does resist transverse strains. The distance between the turns may be varied to suit the conditions, the pitch must, however, be quite flat, as shown, so that the cord will not resist longitudinal extension of the lining.

By wrapping cord 20 helically, in the manner shown and described, there are no breaks as there would be if the cords were parallel and of only the same or slightly greater length than the circumference of the lining. It is desired to call particular attention to the helical winding of cord 20, as this produces an article having greater strength than if short parallel cords were used and it also simplifies the method of manufacture.

It will be noted that the reenforcement does not extend to the ends and the latter can therefore be expanded and this makes it possible to fit cups of slightly different diameters. The longitudinal extensible feature makes it possible to fit cups of different lengths and to maintain the lining under tension at all times, which is not possible where a square cut woven reenforcement is employed.

From the above it will be apparent that the use of a helically wound reenforcing cord involves more than merely omitting the longitudinal cords of a woven fabric, because in the latter case the circumferential cords would be only as long as the circumference and, unless the short cords were carefully staggered, such construction would leave a weak line, or if the ends overlapped a line having double reenforcement, whereas with the helically wound cord reenforcement the reenforcement is uniform all around the tubular lining.

Having described the invention, what is claimed as new is:

1. A flexible lining for teat cups, comprising, a seamless, elastic rubber tube having embedded in its wall reenforcing cord wound helically thereabout, in one direction only and with flat pitch, whereby transverse expansion is prevented and longitudinal extension permitted.

2. A flexible lining for teat cups, comprising, a rubber tube adapted to receive a teat, one end having an outwardly extending flange and the other end having a tubular extension of smaller diameter than the lining and connected with the latter by a tapered portion, the flange and the tubular extension serving as means for attaching the lining to a teat cup, said rubber tube having embedded in its wall a helically extending reenforcing textile cord wound in one direction only, and with flat pitch prevents the tube from expanding transversely, the tube being free to extend in the direction of its length.

3. A flexible lining for teat cups, comprising, a rubber tube adapted to receive a teat, one end having an outwardly extending flange and the other end having a tubular extension of smaller diameter than the lining and connected with the latter by a tapered portion, the flange and the tubular extension serving as means for attaching the lining to a teat cup, said rubber tube having embedded in its wall a textile cord, wound helically thereabout in a single layer and at a flat pitch in that portion between the attaching means, the helically wound cord preventing transverse expansion of the tube while permitting it to extend in the direction of its length.

4. A flexible lining for teat cups, comprising, a rubber tube adapted to receive a teat, one end having an outwardly extending flange and the other end having a tubular extension of smaller diameter than the lining and connected with the latter by a tapered portion, the flange and the tubular extension serving as means for attaching the lining to a teat cup, said rubber tube having embedded in its wall a textile cord, wound helically thereabout in a single layer and at a flat pitch in the portion between the attaching means, the ends of the helically wound cord reenforcing means terminating a short distance from the flange and the tubular extension whereby the ends of the lining can expand to fit different sizes of cups.

H. M. FLINT.
J. EDGAR MOE.